Patented Dec. 23, 1941

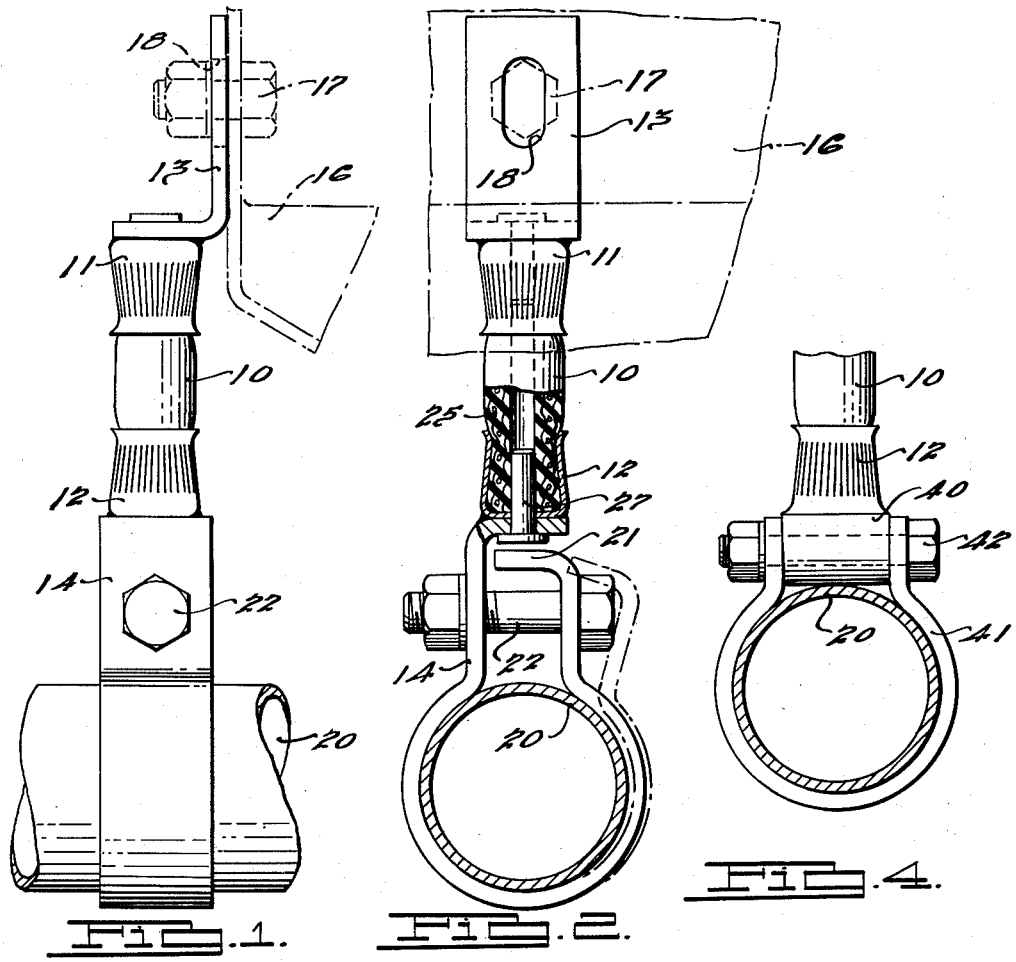
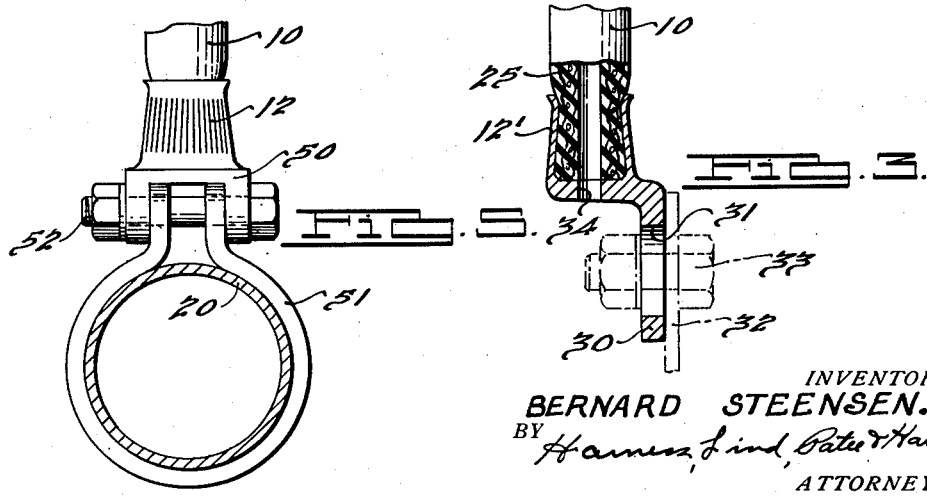

2,267,431

UNITED STATES PATENT OFFICE 2,267,431

FLEXIBLE EXHAUST PIPE SUSPENSION

Bernard Steensen, Detroit, Mich., assignor to Chrysler Corporation, Highland Park, Mich., a corporation of Delaware Application August 7, 1939, Serial No. 288,707

4 Claims. (Cl. 248—60)

My present invention concerns an article suspending device of the hanger type, the invention being of particular utility in suspending the exhaust pipe of an automotive vehicle, such as an automobile, from the body frame of the vehicle. The invention is of utility wherever an article must be suspended from a supporting structure, particularly if such article is elongated similar to a pipe and if the article is subject to vibrations relative to the support which tend to cause fatigue failure of the suspending means. In automobile constructions the exhaust pipe is subjected to an extreme amount of vibration relative to the automobile frame from which it is suspended and such vibrations often cause failure of the suspending means with the result that the exhaust pipe becomes loose and rattles, or in the extreme case may cause serious damage by having one end thereof drop to the ground when the vehicle is in motion. The principal object of the present invention is to provide a pipe hanger which will accommodate such extreme vibrations without failing or becoming loosened.

A further object of the present invention is to provide a pipe hanger comprising a resilient, flexible, non-metallic, intermediate portion which will prevent or lessen the transmission of noises and vibrations from the supported member to the support and vice versa. This is of considerable importance in stationary installations of some character, such as in fluid distributing systems where pump noises and other noises transmitted through the pipe from one portion of the building to another are amplified by the nature of the support from which it is hung. It is also of importance in automobile constructions since the noises and engine movements created by fuel combustion may be transmitted to the automobile frame and amplified by the floor boards and body panels of the automobile chassis.

A further object of the present invention is to provide a construction in a flexible hanger of the character previously described which is simple to manufacture, comprises relatively few parts, is adaptable to a wide range of applications, and is adapted to be constructed so as to be conveniently attachable to fixtures disposed in diverse angular relationships without distorting the flexible element of the device.

The objects and advantages of the present invention may be more fully understood by referring to the following specification taken in connection with the accompanying drawing wherein like numerals refer to like parts throughout.

In the drawing—

Fig. 1 discloses a preferred form of the invention applied to the suspension of an automobile exhaust pipe from a portion of the automobile body frame;

Fig. 2 is an end view of the construction shown in Fig. 1 with portions of the apparatus broken away for clarification of details;

Fig. 3 is a partial view similar to a portion of Fig. 2 and showing a modified form of hanger; and, Figs. 4 and 5 are partial views similar to a portion of Fig. 2 and showing the adaptability of the present invention to article supporting means of several types.

In Figs. 1 and 2 there is shown a preferred form of the invention comprising a resilient, flexible, non-metallic body 10 having its ends retained in caps 11 and 12 which are fastened respectively to a body frame attaching bracket 13 and an exhaust pipe clamp 14. The caps 11 and 12 are welded or otherwise suitably secured to the bracket 13 and the clamp 14, respectively, so as to form the two rigid, metallic elements included in the combination. The body attaching bracket 13 is attached to a suitable portion of the frame indicated at 16 by means of a bolt 17 preferably passing through an elongated opening 18 in the bracket so that vertical adjustment of the bracket with respect to the chassis may be accomplished. The exhaust pipe clamp 14 may comprise a strap adapted to be looped around the exhaust pipe 20 and having its free end 21 bent inwardly underneath the end of the strap attached to the cap 12, the strap being pierced adjacent its extremities whereby to provide passage for a clamping bolt 22 by means of which the strap may be firmly clamped about the exhaust pipe 20.

Each of the caps 11 and 12 preferably comprises a cup-shaped member having a depth substantially as great or greater than its internal diameter and is preferably composed of a malleable metal having considerable rigidity. The flexible body member 10 preferably comprises a rubber tubing having suitable internal reinforcement 25, preferably of fabric or wire mesh, many different types of reinforced rubber tubing being available and suitable for the purpose. The external diameter of the rubber tubing is preferably the same as the largest internal diameter of the cap 11 or 12, which before application to the tubing is preferably of uniform diameter or slightly increasing from the bottom of the cap toward its lip so that the tubing may be readily inserted. After insertion of the tubing in the caps the side walls of the caps are constricted, preferably to a greater extent adjacent the lip of the cup than elsewhere, as shown in the drawing, whereby to compress the tubing and tightly retain the same in the end caps. In order to prevent longitudinal displacement of the tubing with respect to the caps, the tubing is preferably provided with an internal bore of the same diameter as a bolt 27, and the end of the strap 14 attached to the cap 12, the end of the bracket 13 attached to the cap 11, and the bottoms of the caps 11 and 12, are pierced to receive such bolts 27, the heads of which are welded or otherwise suitably secured to the bracket and clamp, respectively. The insertion of the bolt may accompany, precede, or follow the compression of the flanges of the caps, but it is preferable first to attach the bolts to the bracket and clamp in order that the heat of welding or soldering may not injure the tubing. The bolts 27 are preferably of such length as to have the ends thereof below the lips of the caps 11 and 12, the purpose of the bolts being to provide a restriction such as to prevent accidental, relative movement of the body member 10 and the caps 11 and 12.

A modified form of cap and attaching piece is disclosed in Fig. 3 wherein a cap 12' is manufactured integral with an attaching plate 30 having an elongated bolt-receiving opening 31 by means of which a strap 32 or other article gripping member may be adjustably connected thereto by means of a bolt 33. The resilient rubber tubing 10 is inserted in the cap 12' and gripped therein by compression of the flange as previously described. The attaching plate 30 may be provided with an opening 34 coextensive and coaxial with the bore of the tubing 10 for the purpose of receiving a locking bolt as previously described. However, a further detail modification is disclosed in Fig. 3 in that the locking bolt may be omitted, especially if the reinforcing means 25 comprises a strong wire mesh so that compression of the flange 12' would be sufficient to retain the tubing in position.

Figs. 4 and 5 are provided for the purpose of showing the adaptability of the present invention to various forms of pipe clamps or other article hangers. In Fig. 4 the cap 12 is shown as being integral with or permanently affixed to a collet 40 against the ends of which a U-clamp 41 is retained by a connecting bolt 42. In Fig. 5 the cap 12 is shown as integral with or permanently affixed to a knuckle piece 50 adapted to embrace the ends of a spring U-clamp 51 retained therein by means of a pivot bolt 52. Other applications or adaptations of the present invention to various forms of clamping means and brackets should be apparent to those skilled in the art.

Having disclosed several preferred embodiments of the present invention, it should be apparent to those skilled in the art that the same permits of numerous alterations in arrangement and in detail. All such as come within the scope of the following claims are considered a part of the present invention.

I claim:

1. An article support of the type adapted to suspend an article from a supporting structure, comprising a bracket adapted to be attached to the supporting structure, a cup-shaped cap affixed to said bracket and having its side wall extending downward therefrom, a section of flexible, non-metallic tubing having an end inserted in said cap and gripped thereby, the side wall of said cap being permanently constricted adjacent the lip thereof to grip and retain said end of said body member, a pin affixed to said bracket and extending through the bottom of said cap into the bore of said tubing to lock said end in the grip of said cap, an article engaging means, and a second cup-shaped cap affixed to said article engaging means and having its side wall extending upward toward the supporting structure, the opposite end of said section of tubing being retained in said second cap and said second cap having its side wall permanently constricted adjacent the lip thereof to grip and retain said opposite end of said body member.

2. An article support of the type adapted to suspend an article from a supporting structure, comprising a bracket adapted to be attached to the supporting structure, a cup-shaped cap affixed to said bracket and having its side wall extending downward therefrom, a section of flexible, non-metallic tubing having an end inserted in said cap and gripped thereby, the side wall of said cap being permanently constricted adjacent the lip thereof to grip and retain said end of said body member, a pin affixed to said bracket and extending through the bottom of said cap into the bore of said tubing to lock said end in the grip of said cap, an article engaging means, a second cup-shaped cap affixed to said article engaging means and having its side wall extending upward toward the supporting structure, the opposite end of said section of tubing being retained in said second cap and said second cap having its side wall permanently constricted adjacent the lip thereof to grip and retain said opposite end of said body member, and a second pin affixed to said article engaging means and extending through the bottom of said second cap into the bore of said tubing to lock said opposite end in the grip of said second cap.

3. An article support of the type adapted to suspend an article from a supporting structure, comprising a rigid end assembly including a rigid member, a cup-shaped cap affixed to said member and having its side wall extending outwardly therefrom, and a centrally located pin extending into said cap from the bottom thereof toward the lip thereof, a section of flexible, non-metallic tubing having an end inserted in said cap, the pin of said end assembly extending into the bore of said tubing and the wall of said cap being permanently constricted whereby to compress the material of said tubing between the wall of said cap and said pin, a second end assembly comprising a second rigid member, and means to fasten said second end assembly to the opposite end of said section of tubing.

4. An article support of the type adapted to suspend an article from a supporting structure and of particular utility in the construction of automotive vehicles such as automobiles, comprising a bracket assembly adapted to be attached to a portion of the automobile frame, a clamp assembly adapted to be clamped to a portion of the automobile exhaust pipe, and a section of flexible, non-metallic tubing affixed at one end to said bracket assembly and at the other end to said clamp assembly, said bracket assembly comprising a cup-shaped member permanently constricted about an end of said section of tubing and said clamp assembly comprising a second cup-shaped member permanently constricted about the opposite end of said section of tubing, and each of said assemblies comprising a pin extending into the bore of said tubing from the open ends thereof whereby to expand and lock the ends of said section of tubing within the constricted portions of said cups.

BERNARD STEENSEN.